United States Patent [19]
Barth

[11] Patent Number: 5,183,359
[45] Date of Patent: Feb. 2, 1993

[54] ROTARY FASTENER WITH ANTI-STRIP-OUT NIBS

[75] Inventor: Gerald D. Barth, South Elgin, Ill.

[73] Assignee: Illinois Tool Works Inc., Glenview, Ill.

[21] Appl. No.: 881,523

[22] Filed: May 12, 1992

[51] Int. Cl.⁵ .................... F16B 39/282; F16B 39/26
[52] U.S. Cl. .................................. 411/188; 411/161; 411/959
[58] Field of Search ............... 411/160, 161, 185–189, 411/369, 424, 426, 959, 386, 163, 164

[56] References Cited

U.S. PATENT DOCUMENTS

| | | | |
|---|---|---|---|
| 2,147,209 | 2/1939 | Olson | 411/187 |
| 2,147,211 | 2/1939 | Olson | 411/959 X |
| 2,959,204 | 11/1960 | Rigot | 411/186 |
| 3,208,328 | 9/1965 | Myers | 411/386 |
| 3,370,631 | 2/1968 | James | 411/959 X |
| 3,661,046 | 5/1972 | Waud et al. | 411/369 |
| 4,220,188 | 9/1980 | McMurray | 411/188 |

FOREIGN PATENT DOCUMENTS 2908499  9/1980  Fed. Rep. of Germany ...... 411/188

Primary Examiner—Neill R. Wilson
Attorney, Agent, or Firm—Kane, Dalsimer, Sullivan, Kurucz, Levy, Eisele and Richard

[57] ABSTRACT

A torque-absorbing rotary threaded fastener for joining metal panels has a stripping torque sufficiently in excess of its driving torque to ensure that it will be relatively unlikely to be stripped when mechanically driven home. The fastener has a clamping face which includes a number of polyhedral nibs extending axially therefrom and separated from one another by substantially planar uninterrupted portions of the clamping face. The nibs include a leading wall and a trailing wall, facing in the direction of tightening and opposite thereto, respectively. The leading wall may be inclined at a steeper angle with respect to the plane of the clamping face than is the trailing wall, or vice versa. The leading wall and the trailing wall meet to form an apex which is also inclined with respect to the plane of the clamping face, so that the nibs increase in axial height as one views outward toward the periphery of the clamping face.

9 Claims, 4 Drawing Sheets

ROTARY FASTENER WITH ANTI-STRIP-OUT NIBS

BACKGROUND OF THE INVENTION

1. Field of the Invention

The present invention is directed to a torque-absorbing rotary threaded fastener member. Specifically, the present invention is directed to a sheet metal screw or nut for attaching two thin panels together, which screw or nut exhibits an increased stripping torque over those of the prior art.

2. Description of the Prior Art

With presently available sheet metal screws, the range between drive torque and strip torque is unacceptably small. For this reason, it is virtually impossible, given dimensional tolerances and variances in material, to find a single torque setting on power screw drivers which will drive the hardest-to-drive screw without stripping the most strippable screw. Such a situation results in a relatively high number of screws being stripped during installation, leading to reduced clamp load between two metal panels being joined or secured together, or requires substantial operator time for removal and replacement of stripped screws. The screw of the present invention represents a solution to this problem by increasing the range between drive torque and strip torque, making it more difficult to strip the screw with the torque required to drive it into the panels being joined together.

SUMMARY OF THE INVENTION

The torque-absorbing rotary threaded fastener member of the present invention comprises a substantially radially extending clamping face, and a threaded shank or hole extending axially therefrom or therethrough. The clamping face is the underside of the head of the fastener member. Where the fastener member is a screw, the head may be hexagonally shaped, slotted, so that fastener member may be driven by a screwdriver, or may have any other shape or receptacle adapted for cooperation with a suitable driving tool.

On the clamping face and projecting axially therefrom is a plurality of relatively small integral nibs. Each nib is spaced from the next by substantially planar uninterrupted portions of the clamping face. By projecting axially from the clamping face, the nibs will be the first portion of the underside of the fastener member to encounter a metal panel toward which the fastener is being driven. As the fastener member is driven home beyond that point, the nibs dig into the surface of the panel, in so doing increasing the torque required to strip it out.

Each nib is a polyhedron having an end wall on the periphery of the clamping face, a leading wall facing in the direction of tightening of the fastener member, and a trailing wall facing opposite to the direction of tightening. The leading wall is inclined with respect to the plane of the clamping face by a leading wall angle. Likewise, the trailing wall is inclined with respect to the plane of the clamping face by a trailing wall angle. The leading wall angle may be greater than the trailing wall angle, so that the leading wall may inhibit further tightening of the fastener member, while the trailing wall may permit the fastener to be removed by rotation in a direction opposite to tightening. Alternatively, the trailing wall angle may be greater than the leading wall angle, so that the leading wall may still inhibit further tightening of the fastener member, while the trailing wall may resist backout due to vibration.

The leading wall and the trailing wall meet each other and define an apex having an outer end and an inner end. The outer end is the point where the apex meets the end wall of a nib, while the inner end is the innermost point of the nib radially on the clamping face. The apex is inclined with respect to the plane of the clamping face by a taper angle, so that the nib increases in axial height from the inner end of the apex to its outer end.

The present invention will now be described in more complete detail with frequent reference being made to the several drawing figures identified below.

DETAILED DESCRIPTION OF THE PREFERRED EMBODIMENT

Figure 1:
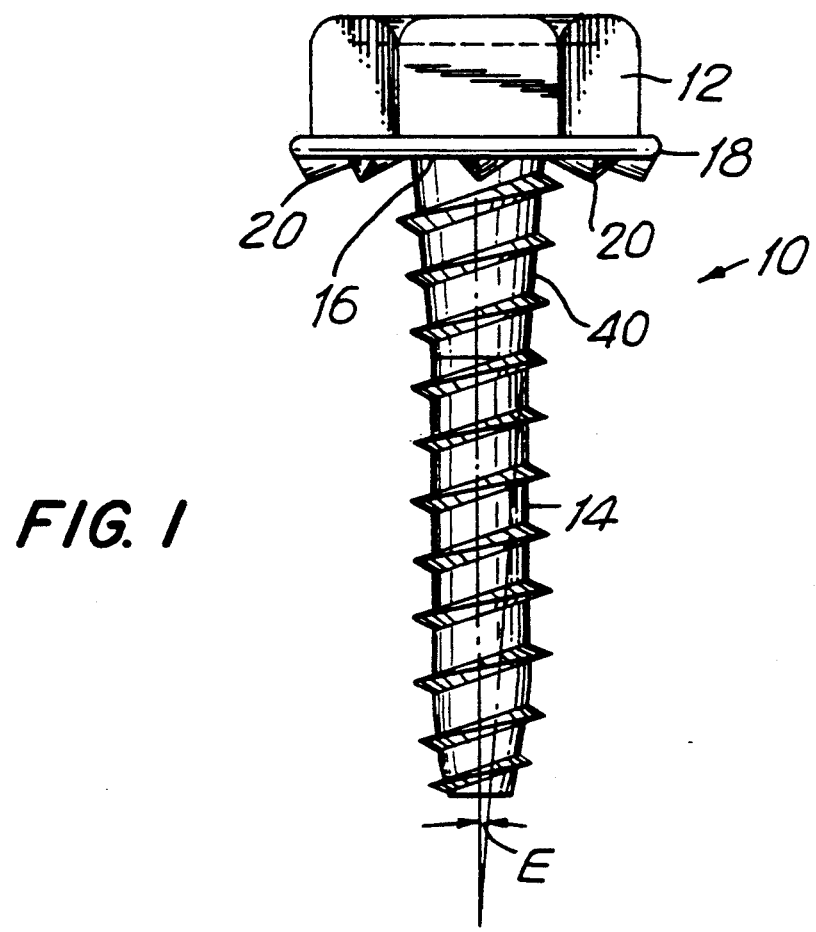
FIG. 1 is a side perspective view of the torque-absorbing rotary threaded fastener of the present invention.

With reference now to the figures, FIG. 1 is a side perspective view of the torque-absorbing rotary threaded fastener of the present invention. The fastener 10 includes a head 12, from the underside of which extends a threaded shank 14 in an axial direction. The underside of the head 12 is a substantially planar clamping face 16 extending substantially radially from said threaded shank 14 to a periphery 18. The plane of the clamping face 16 is substantially perpendicular to the axis of the threaded shank 14.

The threaded shank 14 extends for a predetermined length from the clamping face 16. A portion 40 of that predetermined length adjacent to the clamping face 16 may be tapered outwardly so as to undergo a slight widening in diameter adjacent to the clamping face 16. The taper may, for example, be measured by angle "E" with respect to the axis of the threaded shank 14 as shown in FIG. 1. This slight degree of taper will ensure that, when threads are rolled onto the shank 14, those adjacent to the clamping face 16 will be fully formed for maximum gripping with the thin metal sheets into which the fasteners 10 of the present invention will be driven. Angle "E", for example, may be approximately 4°.

A plurality of relatively small integral nibs 20 projects axially from the clamping face 16 for engaging a workpiece, that is, the surface of a panel into which the fastener 10 is being driven. It is apparent, in FIG. 1, that each nib 20 is a polyhedron extending to the periphery 18 of the clamping face 16.

Figure 2:
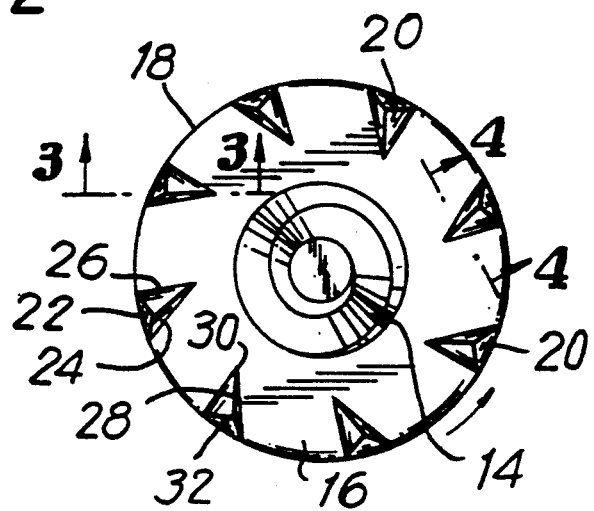
FIG. 2 is a perspective view of the underside of the torque-absorbing rotary threaded fastener taken along the axis of the threaded shank thereof.

A more detailed view of the nibs 20 is presented in FIG. 2, which is a perspective view of the underside of the torque-absorbing rotary threaded fastener 10 taken along the axis of the threaded shank 14. The nibs 20 are separated from one another by substantially planar uninterrupted portions of the clamping face 16. Each nib 20 is a polyhedron, specifically a tetrahedron, having an end wall 22 on the periphery 18 of the clamping face 16, a leading wall 24 facing in the direction of tightening of the fastener 10, and a trailing wall 26 facing opposite to the direction of tightening of fastener 10. By comparing FIGS. 1 and 2, it will be clear to the reader that the leading wall 24 and trailing wall 26 are appropriately named, as, when being tightened, the fastener 10 turns in a counter-clockwise sense in the view of the underside shown in FIG. 2.

The leading wall 24 and trailing wall 26 meet each other, defining an apex 28 having an inner end 30 and an outer end 32. The inner end 30 is the closest point on the apex 28 to the threaded shank 14, while the outer end 32 is the point where the apex 28 meets the end wall 22. The apex 28 may lie in a direction tangent to the threaded shank 14. It will also be observed that the outer end 32 of the apex 28 leads the inner end 32 in the direction of tightening of the fastener 10

As shown in FIG. 2, individual ones of the plurality of nibs 20 are evenly spaced on the clamping face 16. The plurality may be eight, as shown in FIG. 2, or any other suitable number.

Figure 3:
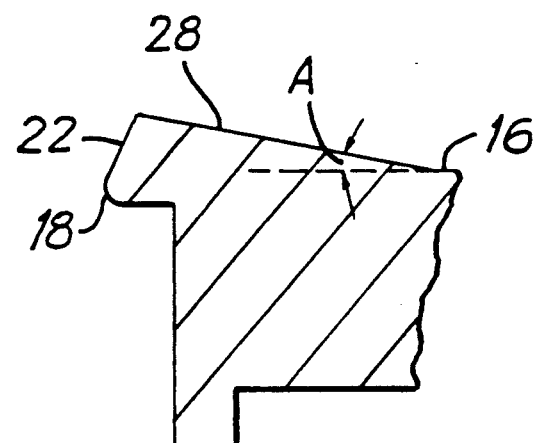
FIG. 3 is a sectional view taken along line 3—3 in FIG. 2.

FIG. 3 is a sectional view taken along line 3—3 in FIG. 2. As may be recognized, the section has been taken along the apex 28 of one of the nibs 20, and, as such, outs through an end wall 22. The apex 28 is inclined with respect to the plane of the clamping face 16 by a taper angle, indicated as angle "A" in FIG. 3. Angle "A" may be approximately 9°. Because the apex 28 is inclined in this manner, the nibs 20 are tapered so that they increase in axial height from the center of the clamping face 16 to the periphery 18 thereof as one views from the inner end 30 of the apex 28 to the outer end 32.

Figure 4:
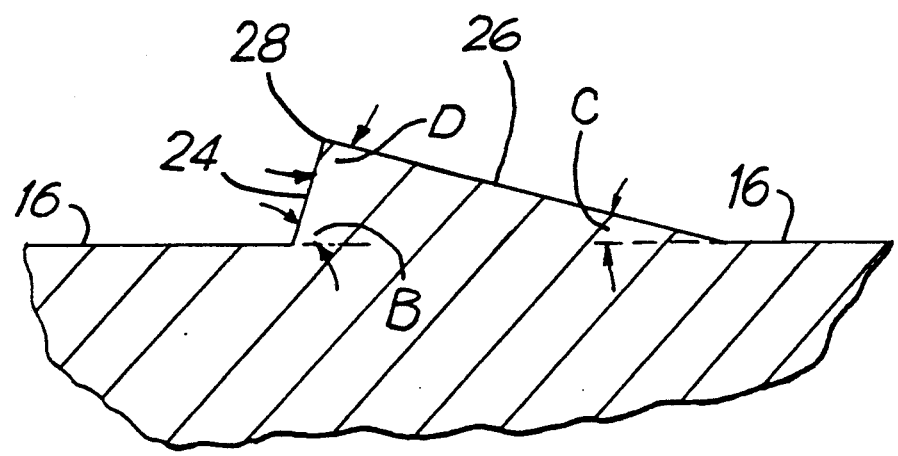
FIG. 4 is a sectional view taken along line 4—4 in FIG. 2.

FIG. 4 is a sectional view taken along line 4—4 in FIG. 2. As may be recognized, the section has been taken in a substantially transverse direction across one of the nibs 20, cutting through a leading wall 24 and a trailing wall 26. The leading wall 24 is inclined with respect to the plane of the clamping face 16 by a leading wall angle, indicated as angle "B" in FIG. 4. In like manner, the trailing wall 26 is inclined with respect to the plane of the clamping face 16 by a trailing wall angle, indicated as angle "C" in FIG. 4. The leading wall angle is greater than the trailing wall angle, in FIG. 4, making the leading wall steeper with respect to the plane of the clamping face than the trailing wall. The leading wall angle, angle "B", may be approximately 75°; the trailing wall angle, angle "C", may be approximately 15°.

In addition, the angle at which the leading wall 24 meets the trailing wall 26 at the apex 28, angle "D" in FIG. 4, may be 90°.

Figure 5:
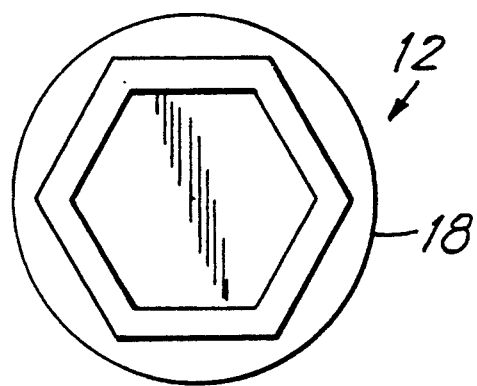
FIG. 5 is a perspective view of the top of the head of the threaded fastener.

FIG. 5 is a perspective view of the top of the head 12 of the threaded fastener 10. The head 12 may be hexagonally shaped, in the manner of a nut, as shown, but, alternatively, may be slotted, so that the fastener 10 may be driven by a screwdriver, or may have any other overall shape or receptacle adapted for cooperation with a suitable driving tool.

Figure 6:
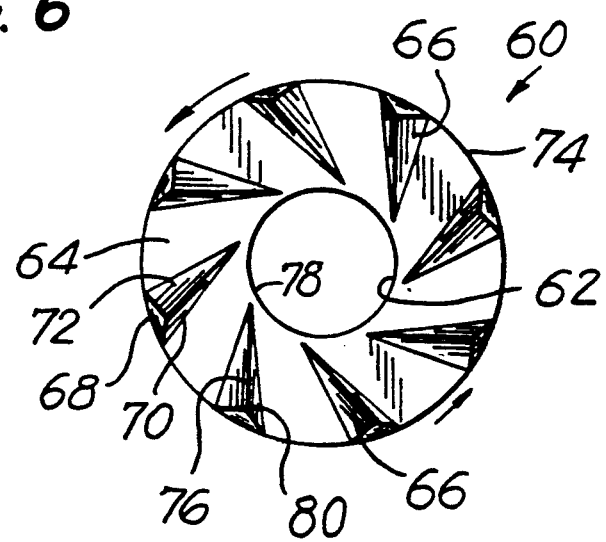
FIG. 6 is a perspective view of the underside of an alternate embodiment of the torque-absorbing rotary threaded fastener of the present invention.

FIG. 6 is a perspective view of the underside of an alternate embodiment of the threaded fastener of the present invention. As depicted in FIG. 6, fastener 60 is configured as a nut rather than a screw, and has a threaded hole 62 extending axially through clamping face 64 in a direction substantially perpendicular to the plane of said clamping face 64.

On clamping face 64 and projecting axially therefrom is again a plurality of relatively small integral nibs 66, having end walls 68, leading walls 70 and trailing walls 72. End walls 68 are on the periphery 74 of the clamping face 64; leading walls 70 and trailing walls 72 meet and define apexes 76, having inner ends 78 and outer ends 80 and which may lie in a direction tangent to threaded hole 62.

The description of the inclinations of the leading walls 70, trailing walls 72, and apexes 76 provided above are applicable for fastener 60. The outer end 80 of each apex 76 again leads the inner end 78 in the direction of tightening rotation. It will be noted, however, that the inner ends 78 of the apexes 76 in FIG. 6 are substantially adjacent to the threaded hole 62, so that each nib 66 may extend over substantially the entire radial extent of the clamping face 64. It goes without saying that, alternatively, the radially elongated nibs 66 may be used on the screw embodiment of the fastener 10, while the radially shorter nibs 20 in FIG. 2 may be included on the nut embodiment of the fastener 60.

Figure 7:
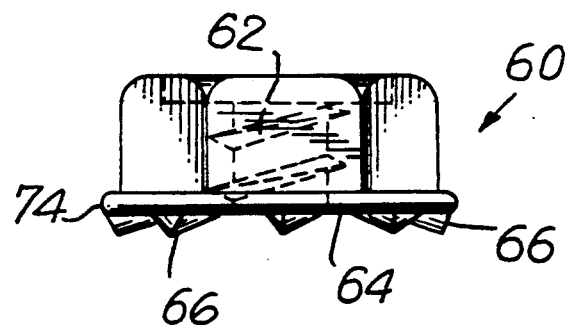
FIG. 7 is a side view of the alternate embodiment shown in FIG. 6.

FIG. 7 is a side view of the nut embodiment of fastener 60 shown in FIG. 6. Nibs 66 project axially from the clamping face 64 in the same manner as do those shown on the screw embodiment of the fastener 10 shown in FIG. 1. A threaded hole 62 passes through fastener 60 in an axial direction substantially perpendicular to the plane of the clamping face 64 instead of a threaded shank 14 projecting axially therefrom.

Figure 8:
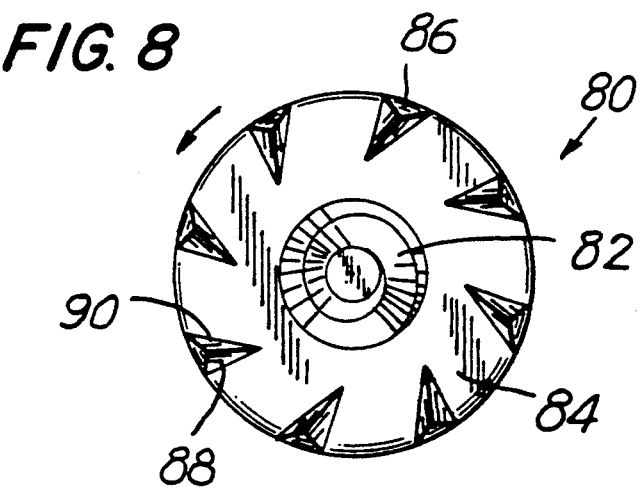
FIG. 8 is a perspective view of the underside of an alternate embodiment of the torque-absorbing rotary threaded fastener of the present invention taken along the axis of the threaded shank thereof.

FIG. 8 is a perspective view of the underside of an alternate embodiment of the torque-absorbing rotary threaded fastener 80 of the present invention taken along the axis of its threaded shank 82. The view presented is much the same as that of FIG. 2. Again, when being tightened, the fastener 80 turns in a counter-clockwise sense, as indicated by the arrow in FIG. 8, in the view of the clamping face 84 presented.

As shown in FIG. 8, a plurality of relatively small integral nibs 86 projects axially from clamping face 84 for engaging a workpiece. Much of the discussion previously made with respect to nibs 20 in FIG. 2 is applicable to those shown in FIG. 8. It will be noted, by way of contrast, that the leading walls 88 of nibs 86 are broader in the view presented in the figure than the trailing walls 90. This is a consequence, in the embodiment shown in FIG. 8, of the fact that the trailing wall 90 is inclined to the clamping face 84 at an angle greater than that by which the leading wall 88 is inclined thereto. That is to say, the trailing wall angle is greater than the leading wall angle. In this configuration, the leading wall 88 may still inhibit further tightening of fastener 80, and may still increase the strip torque thereof, while the trailing wall 90 may resist backout of the tightened fastener 80 due to vibration.

It goes without saying that the "reversed" nibs 86 may also be included on the nut embodiment of the fastener 60.

Whether the torque-absorbing rotary threaded fastener of the present invention is a screw or a nut, the nibs, in addition to increasing the strip torque, will also bite through paint or some other insulating material on a thin metal panel to provide an electrical ground where such may be required.

Modifications to the above would be obvious to those skilled in the art without bringing the torque-absorbing rotary threaded fastener member so modified beyond the scope of the appended claims.

What is claimed is:

1. A torque-absorbing rotary threaded fastener member adapted to be tightened by rotation in one direction, and comprising a substantially radially extending clamping face, said clamping face having a periphery, a threaded shank extending axially therefrom, and a plurality of relatively small integral nibs on said clamping face spaced from one another by substantially planar uninterrupted portions of said clamping face and projecting axially therefrom for engaging a workpiece, each said nib being a polyhedron having an end wall on said periphery of said clamping face, a leading wall facing in the direction of tightening of said fastening member and being angularly disposed with respect to the plane of the clamping face by a leading wall angle, and a trailing wall facing opposite to the direction of tightening of said fastener member and being angularly disposed with respect to the plane of the clamping face by a trailing wall angle, said leading wall and said trailing wall meeting each other and defining an apex having an outer end and an inner end, said outer end being where said apex meets said end wall, said apex being inclined by a taper angle with respect to the plane of said clamping face so that nibs increase in axial height from said inner end of said apex to said outer end of said apex, wherein said trailing wall angel is greater than said leading wall angle.

2. A torque-absorbing rotary threaded fastener member adapted to be tightened by rotation in one direction, and comprising a substantially radially extending clamping face, said clamping face having a periphery, a threaded shank extending axially therefrom, and a plurality of relatively small integrally nibs on said clamping face spaced from one another by substantially planar uninterrupted portions of said clamping face and projecting axially therefrom for engaging a workpiece, each said nib being a polyhedron having an end wall on said periphery of said clamping face, a leading wall facing in the direction of tightening of said fastener member and being angularly disposed with respect to the plane of the clamping face by a leading wall angle, and a trailing wall facing opposite to the direction of tightening of said fastener member and being angularly disposed with respect to the plane of the clamping face by a trailing wall angle, said leading wall and said trailing wall meeting each other and defining an apex having an outer end and an inner end, said outer end being where said apex meets said end wall, said apex being inclined by a taper angle with respect to the plane of said clamping face so that said nibs increase in axial height from said inner end of said apex to said outer end of said apex, wherein said apex is in a direction tangent to said threaded shank extending axially from said clamping face.

3. A torque-absorbing rotary threaded fastener member adapted to be tightened by rotation in one direction, and comprising a substantially radially extending clamping face, said clamping face having a periphery, a threaded shank extending axially therefrom, and a plurality of relatively small integral nibs on said clamping face spaced from one another by substantially planar uninterrupted portions of said clamping face and projecting axially therefrom for engaging a workpiece, each said nib being a polyhedron having an end wall on said periphery of said clamping face, a leading wall facing in the direction of tightening of said fastener member and being angularly disposed with respect to the plane of the clamping face by a leading wall angle, and a trailing wall facing opposite to the direction of tightening of said fastener member and being angularly disposed with respect to the plane of the clamping face by a trailing wall angle, said leading wall and said trailing wall meeting each other and defining an apex having an outer end and an inner end, said outer end being where said apex meets said end wall, said apex being inclined by a taper angle with respect to the plane of said clamping face so that said nibs increase in axial height from said inner end of said apex to said outer end of said apex, wherein said inner end of said apex is substantially adjacent to said threaded shank, so that each nib may extend over substantially the entire radial extent of said clamping face.

4. A torque-absorbing rotary threaded fastener member adapted to be tightened by rotation in one direction, and comprising a substantially radially extending clamping face, said clamping face having a periphery, threaded shank extending axially therefrom, and a plurality of relatively small integral nibs on said clamping face spaced from one direction by substantially planar uninterrupted portions of said clamping face and projecting axially therefrom for engaging a workpiece, each said nib being a polyhedron having an end wall on said periphery of said clamping face, a leading wall facing in the direction of tightening of said fastener member and being angularly disposed with respect to the plane of the clamping face by a leading wall angle, and a trailing wall facing opposite to the direction of tightening of said fastener member and being angularly disposed with respect to the plane of the clamping face by a trailing wall angle, said leading wall and said trailing wall meeting each other and defining an apex having an outer end and an inner end, said outer end being where said apex meets said end wall, said apex being inclined by a taper angle with respect to the plane of said clamping face so that said nibs increase in axial height from said inner end of said apex to said outer end of said apex, wherein said threaded shank includes a tapering portion adjacent to said clamping face, so that the diameter of said threaded shank increases adjacent to said clamping face.

5. A torque-absorbing rotary threaded fastener member as claimed in claim 4 wherein said tapering portion is characterized by an angle of taper with respect to the axis of said threaded shank, said angle of taper being approximately 4°.

6. A torque-absorbing rotary threaded fastener member adapted to be tightened by rotation in one direction, and comprising a substantially radially extending clamping face, said clamping face having a periphery, a threaded hole extending axially therethrough, and a plurality of relatively small integral nibs on said clamping face spaced from one another by substantially planar uninterrupted portions of said clamping face and projecting axially therefrom for engaging a workpiece, each said nib being a polyhedron having an end wall on said periphery of said clamping face, a leading wall facing in the direction of tightening of said fastener member and being angularly disposed with respect to the plane of the clamping face by a leading wall angle, and a trailing wall facing opposite to the direction of tightening of said fastener member and being angularly disposed with respect to the plane of the clamping face by a trailing wall angle, said leading wall and said trailing wall meeting each other and defining an apex having an outer end and an inner end, said outer end being where said apex meets said end wall, said apex being inclined by a taper angle with respect to the plane of said clamping face so that said nibs increase in axial height from said inner end of said apex to said outer end of said apex, wherein said trailing wall angle is greater than said leading wall angle.

7. A torque-absorbing rotary threaded fastener member adapted to be tightened by rotation in one direction, and comprising a substantially radially extending clamping face, said clamping face having a periphery, a threaded hole extending axially therethrough, and a plurality of relatively small integral nibs on said clamping face spaced from one another by substantially planar uninterrupted portions of said clamping face and projecting axially therefrom for engaging a workpiece, each said nib being a polyhedron having an end wall on said periphery of said clamping face, a leading wall facing in the direction of tightening of said fastener member and being angularly disposed with respect to the plane of the clamping face by a leading wall angle, and a trailing wall facing opposite to the direction of tightening of said fastener member and being angularly disposed with respect to the plane of the clamping face by a trailing wall angle, said leading wall and said trailing wall meeting each other and defining an apex having an outer end and an inner end, said outer end being where said apex meets said end wall, said apex being inclined by a taper angle with respect to the plane of said clamping face so that said nibs increase in axial height from said inner end of said apex to said outer end of said apex, wherein said outer end of said apex leads said inner end of said apex in the direction of tightening rotation.

8. A torque-absorbing rotary threaded fastener member adapted to be tightened by rotation in one direction, and comprising a substantially radially extending clamping face, said clamping face having a periphery, a threaded hole extending axially therethrough, and a plurality of relatively small integral nibs on said clamping face spaced from one another by substantially planar uninterrupted portions of said clamping face and projecting axially therefrom for engaging a workpiece, each said nib being a polyhedron having an end wall on said periphery of said clamping face, a leading wall facing in the direction of tightening of said fastener member and being angularly disposed with respect to the plane of the clamping face by a leading wall angle, and a trailing wall facing opposite to the direction of tightening of said fastener member and being angularly disposed with respect to the plane of the clamping face by a trailing wall angle, said leading wall and said trailing wall meeting each other and defining an apex having an outer end and an inner end, said outer end being where said apex meets said end wall, said apex being inclined by a taper angle with respect to the plane of said clamping face so that said nibs increase in axial height from said inner end of said apex to said outer end of said apex, wherein said apex is in a direction tangent to said threshold hole extending axially through said clamping face.

9. A torque-absorbing rotary threaded fastener member adapted to be tightened by rotation in one direction, and comprising a substantially radially extending clamping face, said clamping face having a periphery, a threaded hole extending axially therethrough, and a plurality of relatively small integral nibs on said clamping face spaced from one another by substantially planar uninterrupted portions of said clamping face and projecting axially therefrom for engaging a workpiece, each said nib being a polyhedron having an end wall on said periphery of said clamping face, a leading wall facing in the direction of tightening of said fastener member and being angularly disposed with respect to the plane of the clamping face by a leading wall angle, and a trailing wall facing opposite to the direction of tightening of said fastener member and being angularly disposed with respect to the plane of the clamping face by a trailing wall angle, said leading wall and said trailing wall meeting each other and defining an apex having an outer end and an inner end, said outer end being where said apex meets on said end wall, said apex being inclined by a taper angle with respect to the plane of said clamping face so that said nibs increase in axial height from said inner end of said apex to said outer end of said apex, wherein said inner end of said apex is substantially adjacent to said threaded hole, so that each nib may extend over substantially the entire radial extend of said clamping face.

* * * * *